United States Patent [19]

Mills

[11] Patent Number: 5,443,777

[45] Date of Patent: Aug. 22, 1995

[54] METHOD FOR PRODUCING AN INVISIBLE TEAR SEAM FOR AN AIR BAG DEPLOYMENT OPENING COVER

[75] Inventor: Daniel H. Mills, Durham, N.H.

[73] Assignee: Davidson Textron Inc., Dover, N.H.

[21] Appl. No.: 985,916

[22] Filed: Dec. 4, 1992

[51] Int. Cl.⁶ .............................................. B28B 7/22
[52] U.S. Cl. .................... 264/255; 280/732; 264/265; 425/434; 425/435
[58] Field of Search ............... 264/255, 265; 425/434, 425/435, 425, 427, 429; 280/731, 732

[56] References Cited

U.S. PATENT DOCUMENTS

| | | | |
|---|---|---|---|
| 3,640,546 | 2/1972 | Brawn | 280/150 |
| 4,246,213 | 1/1981 | Takamatsu et al. | 264/46.7 |
| 4,610,620 | 9/1986 | Gray | 425/434 |
| 4,623,503 | 11/1986 | Anestis et al. | 264/302 |
| 4,886,630 | 12/1989 | Sugiura et al. | 264/46.6 |
| 5,013,064 | 5/1991 | Miller et al. | 280/730 |
| 5,013,065 | 5/1991 | Kreuzer | 280/743 |
| 5,032,076 | 7/1991 | Jackson, Jr. | 425/435 |
| 5,082,310 | 1/1992 | Bauer | 280/732 |

*Primary Examiner*—James J. Bell
*Attorney, Agent, or Firm*—Reising, Ethington, Barnard, Perry & Milton

[57] ABSTRACT

A method and apparatus is disclosed for forming a cover for an air bag deployment opening, the cover having a tear seam defined by a reduction in thickness of the cover. The cover can be formed as an unitary part of an outer skin layer for an automobile interior trim structure. The apparatus includes a thin shell having an inner surface upon which a thermoplastic material is cast to form the outer skin. A multiplicity of pins are disposed on and extend away from a backside thereof to transfer heat to the inner surface. The density of the pins is reduced on the portion of the backside of the shell proximate the portion of the inner surface upon which the tear seam of the outer skin is to be formed. The shell can be heated or cooled by using a plurality of nozzles to impinge heated or cooled air onto predetermined locations of the backside. A cover and tear seam construction is also disclosed.

13 Claims, 4 Drawing Sheets

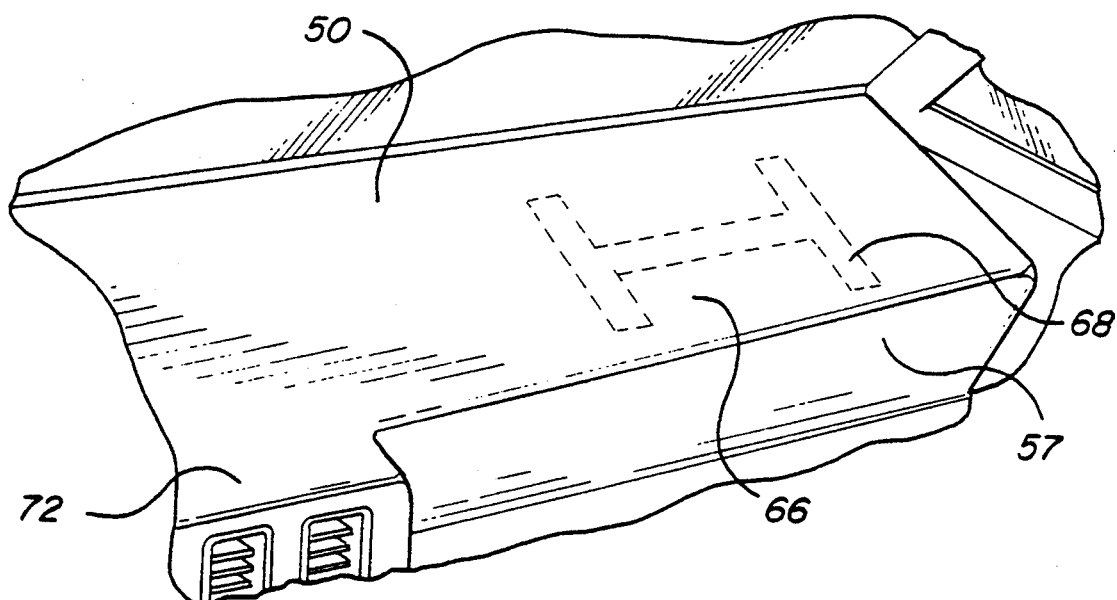
FIG-8
FIG-9
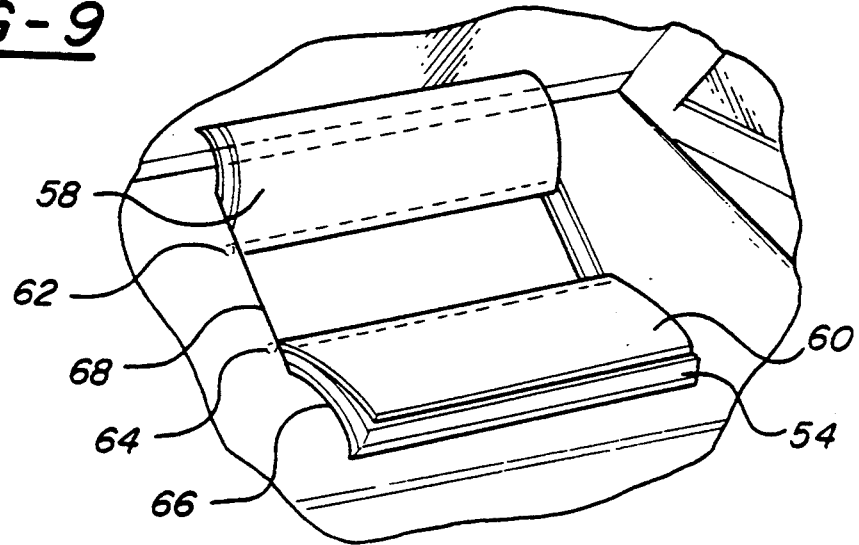

METHOD FOR PRODUCING AN INVISIBLE TEAR SEAM FOR AN AIR BAG DEPLOYMENT OPENING COVER

BACKGROUND OF THE INVENTION

1. Technical Field

This invention relates to automotive interior trim structures incorporating a cover for an air bag deployment opening and, in particular, relates to a method and apparatus for casting a tear seam into the decorative outer skin of an automobile interior trim structure by controlling the relative temperature of the portion of the mold used to form the tear seam in the outer skin. Further, the invention relates to a resultant cover and tear seam construction.

2. Description of the Related Art

Various types of supplemental involuntary restraint systems (SIRs) are currently being provided by automobile manufacturers to help reduce the extent of personal injuries incurred in automobile accidents. Air bags are increasingly becoming one of the most common and popular SIRs utilized. Air bags are designed to inflate during a collision to restrain forward movement the driver and/or other occupants to help avoid injurious contact with interior portions of the automobile. Driver's side air bags currently come as standard equipment on many models and optional passenger side air bags are becoming more common.

Air bags are typically stowed behind one or more interior trim structures, such as the steering wheel cover, door panel, or passenger side portion of the instrument panel. These interior trim structures must therefore be specially manufactured to permit deployment of the air bag upon a collision being detected. Such manufacturing entails consideration of a multitude of design requirements, such as the functional requirements of the air bag deployment system and the aesthetic requirements of the interior trim structures. Moreover, many of these requirements involve countervailing considerations. For example, the air bag should be able to be deployed virtually instantaneously upon a collision being detected. However, it should be stowed in such a manner as to 1) inhibit accidental or intentional tampering that would interfere with its performance and 2) contribute to an overall pleasing interior appearance. In regard to the latter consideration, it is as a matter of human psychology, undesirable to remind the automobile occupants of the dangers of driving and the existence of the air bag is therefore preferably made entirely invisible.

Interior trim structures used in automotive applications typically comprise a composite article having a foam layer formed between a rigid insert and a decorative outer skin. The insert provides structural reinforcement to the interior trim structure and is used to secure the trim structure within the automobile interior. Because the reinforcing insert is rigid, it either has an opening through which the air bag is deployed or is manufactured with one or more hinges which define one or more doors that open upon the air bag being inflated. The air bag is stowed behind this composite article until such time as it must be deployed.

In the typical air bag deployment scheme, the air bag forces its way out of its stowed position upon expansion. Various arrangements of the interior trim structures have been suggested to accommodate deployment of the air bag in this manner. For example, U.S. Pat. No. 3,640,546, issued Feb. 8, 1972 to D. S. Brawn, discloses various air bag enclosures, each of which essentially comprise a pair of doors secured together by a seal which is ruptured upon expansion of the air bag. The inflating air bag forces the doors to swing outwardly, thereby allowing the air bag to expand into the automobile compartment. In one of the disclosed embodiments, the doors are covered by an outer layer which is preweakened along a joint line. Although this patent states that the preweakening can be accomplished by reducing the thickness of the outer layer along the joint line, the only means disclosed for accomplishing that result is high frequency heating while loading.

U.S. Pat. No. 4,246,213, issued Jan. 20, 1981 to Y. Takamatsu et al., discloses a method for casting in V-shaped cut portions that extend through the foam layer and partially through the outer layer to define a tear seam along which the trim structure ruptures upon inflation of the air bag. The method utilizes two male mold members, each having projections which forms a part of the cut portion. The first mold member is used to form the outer layer and has one or more projections which form a groove in the back side of the outer layer. The second mold member is used to form the foam layer and has one or more projections arranged to extend at their tips into the groove previously formed in the outer layer. These projections form slits in the foam layer which are aligned with the grooves to thereby form the V-shaped cut portions.

Arrangements utilizing a continuous foam layer and outer skin are known. For example, U.S. Pat. No. 5,082,310, issued Jan. 21, 1992 to D. J. Bauer, discloses a closure for an air bag deployment opening which includes a pair of rigid, hinged doors covered by a foam layer and an outer skin. The doors are connected by a bridging portion which breaks upon inflation of the air bag. The outer skin is cut (i.e., grooved) along its inside surface proximate the bridging portion of the doors to define a tear seam along which it ruptures upon deployment of the air bag.

One problem that results from cutting or scoring a tear seam into the skin is that, at colder temperatures, the plastics used to form the outer skin become relatively brittle and the skin is therefore more susceptible to cracking along the tear seam. At the opposite temperature extremes, these plastics become relatively soft and deformable, thereby becoming more difficult to rupture. These offsetting considerations make it more difficult for manufacturers to produce an outer skin having a tear seam that remains unbroken when subjected to expected environmental conditions yet will rupture when needed.

A second disadvantage of cut tear seams is that they require a separate manufacturing step which must be completed after the outer skin is formed, but prior to co-molding the skin to the foam layer. Moreover, as shown in U.S. Pat. No. 5,082,310, discussed above, cutting the skin typically requires that it first be removed from the mold.

Another method for forming grooves in a thermoplastic material is disclosed in U.S. Pat. No. 4,886,630, issued Dec. 12, 1989 to T. Sugiura et al. This method, however, not only requires that the outer skin member be preformed in a separate operation, but also requires, in addition to the female mold member, a separate male mold member and a heated press member which extends through an aperture in the male mold member to form the grooves.

The aforementioned shortcomings of cutting and press-forming an outer skin to form a groove therein can be avoided by casting the tear seam into the skin during formation of the skin. Although U.S. Pat. No. 4,246,213, discussed above, shows one method of casting a groove into the tear seam, it requires a separate male mold member which must be inserted and removed from the female mold member during each manufacturing cycle.

Other, more suitable means of forming an outer skin are disclosed in U.S. Pat. No. 4,623,503, issued Nov. 18, 1986 to E. Anestis et al., and U.S. Pat. No. 5,032,076, issued Jul. 16, 1991 to K. L. Jackson, Jr., each of which is hereby incorporated by reference. U.S. Pat. No. 4,623,503 discloses a method and apparatus for casting an article by impinging heated air onto the backside of a mold to fuse together material disposed on the inner surface of the mold. U.S. Pat. No. 5,032,076 discloses a mold assembly having heat transfer pins located on the outer surface of a mold shell to facilitate the transfer of heat from air flowing about the outer surface to the inner surface of the mold.

SUMMARY OF THE INVENTION

The present invention provides a method and apparatus for producing an outer skin covering for an air bag deployment opening in a automobile interior trim structure. The cover is formed from a thermoplastic material which is fused upon the surface of a mold by heating. The cover includes a wide tear seam formed during the mold process. The method for forming the cover having such a tear seam comprises (a) placing a thermoplastic material on a mold surface, (b) heating the portion of the mold surface used to form the tear seam to a first temperature and simultaneously heating the surrounding portion of the mold surface to a temperature greater than the first temperature to thereby form a layer of thermoplastic material having a thinned portion which defines the tear seam, and (c) cooling the layer of thermoplastic material. Preferably, the method includes impinging air having an elevated temperature onto pins extending from a back surface of the mold and transferring heat from the air to the mold surface through the pins.

An apparatus suitable for use with this method includes a mold shell having an inner mold surface upon which the cover is to be formed and an outer mold surface. The shell has a multiplicity of heat transfer pins disposed on and extending away from the outer surface, the density of the pins opposite the portion of the mold surface used to form the tear seam being less than the density of the surrounding pins. The pins can be used to form a tear seam having any desired configuration, such as the C, H, U, and X designs commonly used in the automotive industry. Preferably, the apparatus includes a plurality of nozzles disposed to impinge air upon the pins and outer surface of the mold shell. The arrangement of these nozzles can be used in conjunction with the density of the pins to balance the mold surface temperature along the portion of the mold surface used to form the tear seam.

The present invention simplifies production of tear seams in air bag deployment opening covers. The tear seam is formed as a part of a standard operation for casting of the outer skin so that no secondary operation is needed. That is, the method and apparatus of the present invention provides an outer skin having a tear seam incorporated therein which can be manufactured in the same amount of time that is required to manufacture an outer skin not having a tear seam. As a result, cycle times for manufacturing these articles is reduced and productivity is therefore increased.

BRIEF DESCRIPTION OF THE DRAWINGS

A preferred exemplary embodiment of the present invention will hereinafter be described in conjunction with the appended, wherein like designations denote like elements, and:

FIG. 8 is partial perspective view of an instrument panel mounted within an automobile interior compartment and showing in hidden lines an air bag deployment opening cover defined by a tear seam of the present invention; and FIG. 9 is a partial perspective view of the instrument panel of FIG. 8 with the air bag deployment opening cover having been ruptured along the tear seam.

DESCRIPTION OF PREFERRED EMBODIMENT

Figure 1:
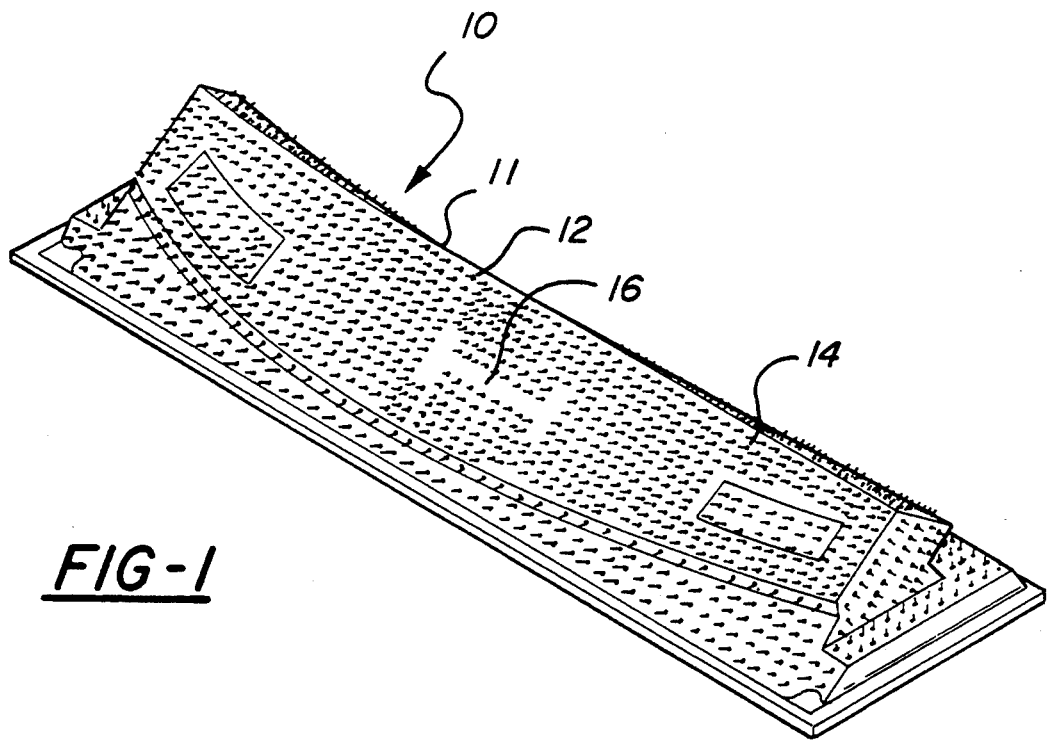
FIG. 1 is a perspective view of the outer surface of a mold shell of the present invention having heat transfer pins located thereon.
Figure 2:
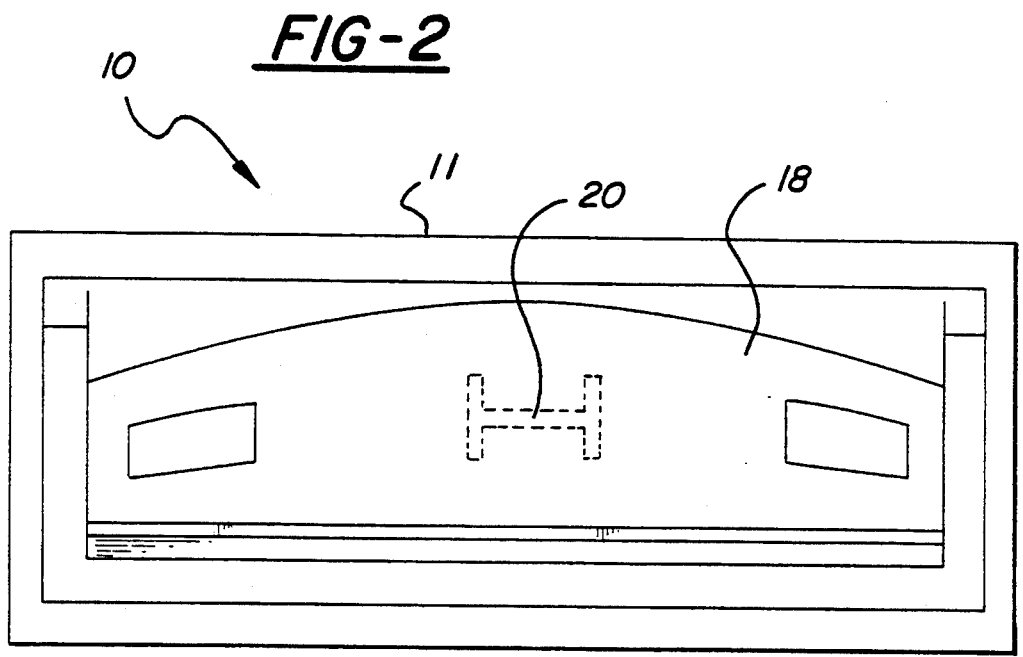
FIG. 2 is a top view of the mold shell of FIG. 1 showing in hidden lines the portion of the inner mold surface which forms the tear seam of the present invention.

In accordance with a preferred embodiment, there is diagrammatically illustrated in FIG. 1 a mold 10 formed of a thin shell 11 having a multiplicity of heat transfer pins 12 disposed on and extending away from an outer surface or backside 14 thereof. Backside 14 includes a open portion 16 which is defined by the absence of any of the pins 12. As shown in FIG. 2, mold 10 also includes an inner surface 18 upon which a thermoplastic material can be cast to thereby form an outer skin covering for an air bag deployment opening which is a unitary part of an automobile interior trim structure. The contour of inner surface 18 forms the exposed surface of the interior trim structure when it is placed in its intended environment and surface 18 can therefore be textured and include other aesthetically pleasing detailing. Inner surface 18 includes a tear seam portion 20 which is defined by and located opposite open portion 16 of backside 14. Tear seam portion 20 is neither raised nor recessed from the surrounding portion of inner surface 18 and is therefore imperceptible when viewing inner surface 18. Accordingly, tear seam portion 20 is depicted in FIG. 2 by hidden lines.

Pins 12 facilitate the transfer of heat from air flowing about backside 14 to surface 18. Therefore, the amount of heat transferred to any one region of surface 18 depends upon the spacing (i.e., density) of pins 12 on the portion of backside 14 opposite that region. By eliminating pins 12 from open portion 16, tear seam portion 20 will not achieve as high temperatures as the surrounding portion of surface 18. As discussed below, utilization of this effect permits casting in a single step of a layer of thermoplastic material having a relatively thin tear seam formed upon tear seam portion 20.

The density of pins 12 along various portions of backside 14 can be varied to provide desirable temperatures about the corresponding portions of inner surface 18. In this regard, it should become apparent to one skilled in the art that the arrangement and density of pins 12 shown in the various figures are illustrative only. For instance, the pins 12 need not be completely eliminated from open portion 16, rather the density of pins 12 need only be reduced within portion 16 to the extent necessary to maintain the temperature of tear seam portion 20 less than the temperature of the surrounding portion of inner surface 18 when backside 14 is subjected to a heat source such as heated air.

Mold shell 11 preferably comprises an electro-form nickel tool which can be constructed using known techniques. Pins 12 can be made from any thermally conductive material such as copper coated steel or nickel. Pins 12 are preferably cylindrical in shape and have an enlarged diameter head portion at which they are attached to backside 14. Pins 12 can be attached to backside 14 by capacitive discharge welding or other suitable means and can even be formed as a unitary part of shell 11. In particular, pins 12 can be sized and attached to backside 14 of shell 11 as described and shown in the above-mentioned U.S. Pat. No. 5,032,076, hereby incorporated by reference.

Figure 3:
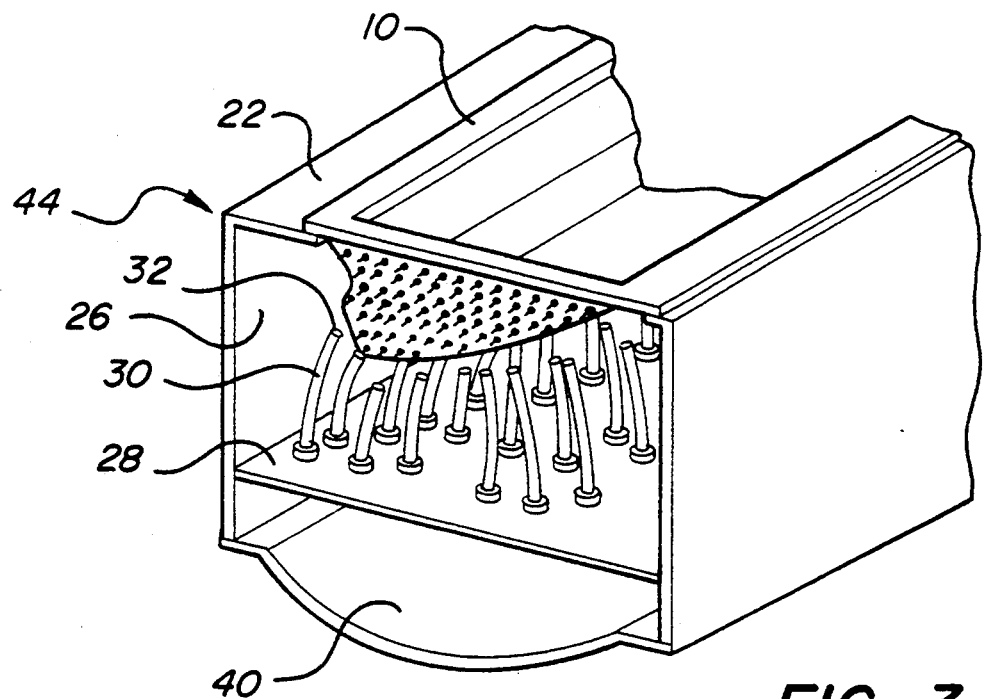
FIG. 3 is a partial perspective view of the mold of FIGS. 1 and 2 disposed in a mold box suitable for heating and cooling the mold.
Figure 4:
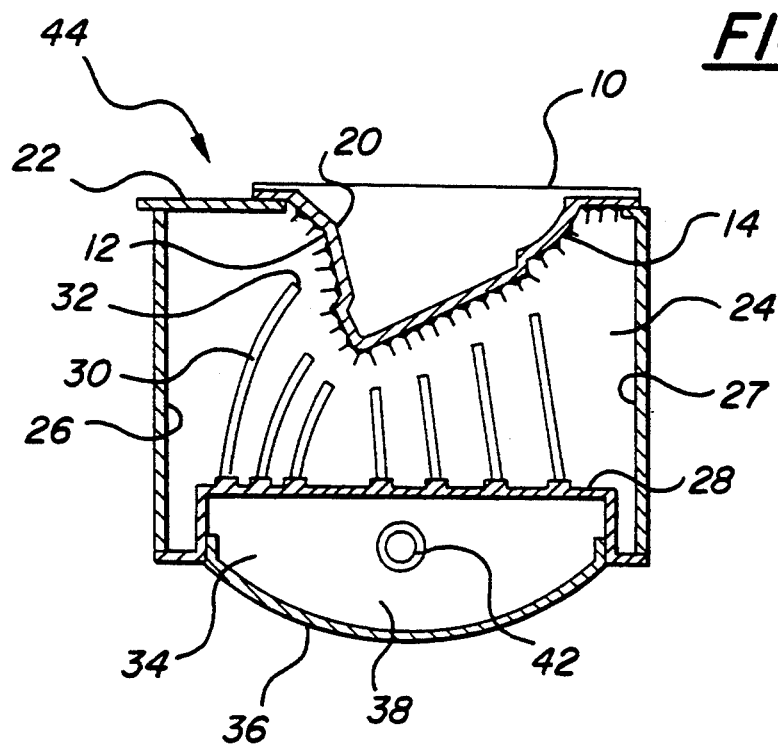
FIG. 4 is a cross-sectional view of the mold shell and mold box of FIG. 3.

FIGS. 3 and 4 show mold 10 placed within a mold box 22 which provides a convenient and advantageous means of heating or cooling mold 10. Backside 14 of mold 10 forms a cavity 24 with walls 26–28 of mold box 22. A plurality of discharge nozzles 30 extend from wall 28. Nozzles 30 each have an orifice 32 located proximate a different region of backside 14. Nozzles 30 are mounted on wall 28 to permit fluidic communication to cavity 24 from a plenum 34 which is defined by interior wall 28, an outer wall 36, and side walls 38 and 40. Plenum 34 includes an inlet 42 for forcing air or other fluid into plenum 34. Thus, heated or cooled air forced through inlet 42 exits plenum 34 through nozzles 30 and impinges upon pins 12 and backside 14 to thereby heat or cool surface 18, as desired. The construction and use of mold box 22 is further described in the aforementioned U.S. Pat. No. 4,623,503, hereby incorporated by reference. Mold box 22, including nozzles 30 and plenum 34, together with mold 10 comprise a mold unit 44.

OPERATION

With continuing reference to FIG. 4, a process using mold unit 44 for producing a cover for an air bag deployment opening having a tear seam incorporated therein will hereinafter be described. Initially, mold unit 44 is placed in an inverted position so that inner surface 18 faces downwardly (e.g., as shown in FIG. 1) and mold 10 is mated with an open powder box (not shown) containing a powdered thermoplastic material to thereby form a sealed mold chamber defined by inner surface 18 and the interior walls of the powder box. The thermoplastic material can be a dry resin powder material with suitable coloring and plasticizer content, such as described in U.S. Pat. No. 4,923,657 issued May 8, 1990 to J. C. Gembinski et al. Mold 10 is then heated to a sufficient temperature to cause approximately one millimeter of dry powder to attach and fuse. Mold unit 44 and the powder box are then rotated 180° as a single unit to dump the dry powder against surface 18. Since inner surface 18 has been heated, a layer of the dry powder forms across surface 18 and fuses together. The remaining powder is dumped back into the powder box by rotating the powder box and mold unit 44 back to their initial positions. The powder box and mold unit 44 are then disconnected and mold 10 is heated more to cure the thermoplastic material together. Finally, mold 10 is cooled to remove the layer of thermoplastic material formed upon inner surface 18.

Automated production apparatuses for performing these steps are well known to those skilled in the art and more specific examples are shown in the above-mentioned U.S. Pat. No. 5,032,076, as well as U.S. Pat. No. 4,610,620, issued Sep. 9, 1986 to J. D. Gray. As will be understood by those skilled in the art, such a process could also be implemented using a charge of liquid thermoplastic material such as liquid plastisol. The above-mentioned U.S. Pat. No. 4,623,503 utilizes such a process and contains details concerning the associated apparatus for automated implementation of that process.

Inner surface 18 of mold 10 is heated by providing a flow of heated air along pins 12 and backside 14. Preferably, nozzles 30 are used to provide this air flow and can be positioned in conjunction with the distribution of pins 12 on backside 14 to control the temperature at all locations along inner surface 18. By selectively distributing pins 12 about backside 14 and, preferably, by selectively positioning nozzles 30, tear seam portion 20 of inner surface 18 can be held at a lower temperature than the temperature of the remainder of inner surface 18 when mold 10 is heated. As a result, the thickness of the layer of thermoplastic material that fuses on inner surface 18 will be less at tear seam portion 20 than at the surrounding portion.

Figure 5:
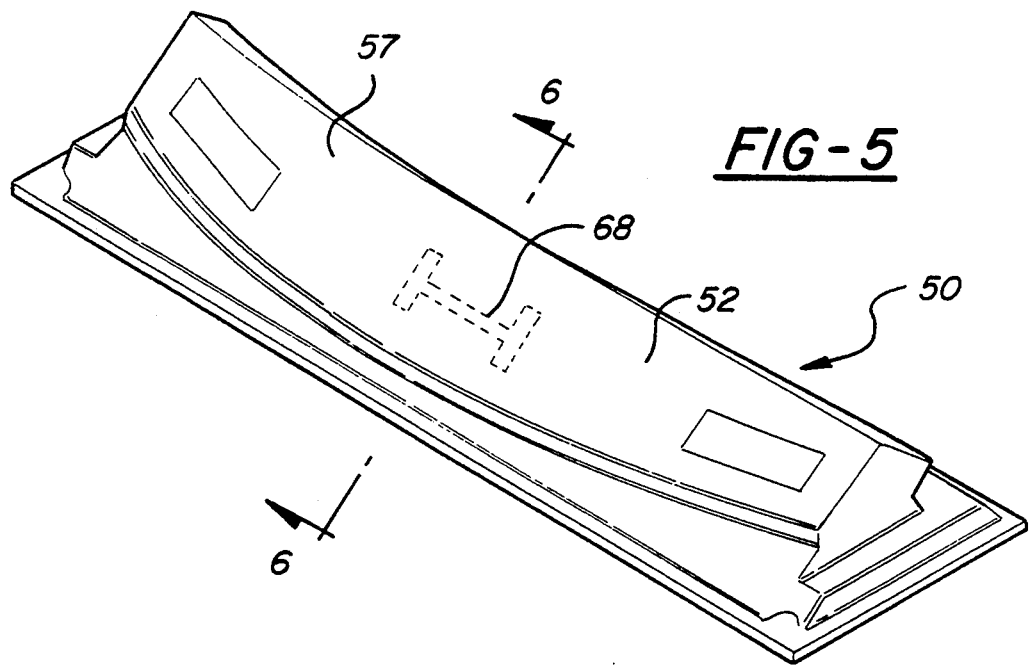
FIG. 5 is a perspective view of an automobile interior trim structure incorporating an invisible tear seam of the present invention made from the mold shell of FIG. 1.
Figure 6:
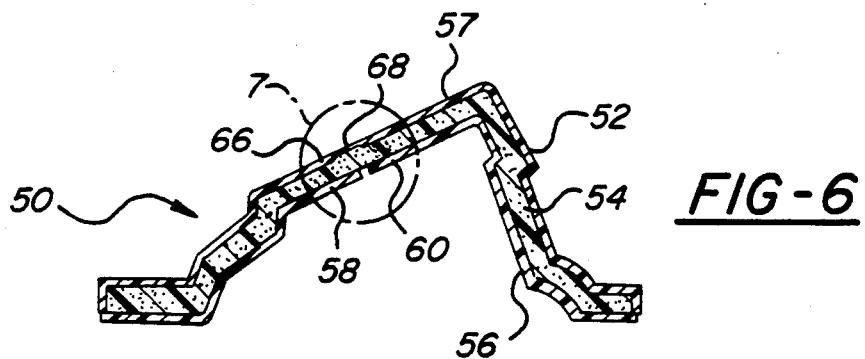
FIG. 6 is a cross-sectional view of the interior trim structure taken along the 6—6 line of FIG. 5.
Figure 7:
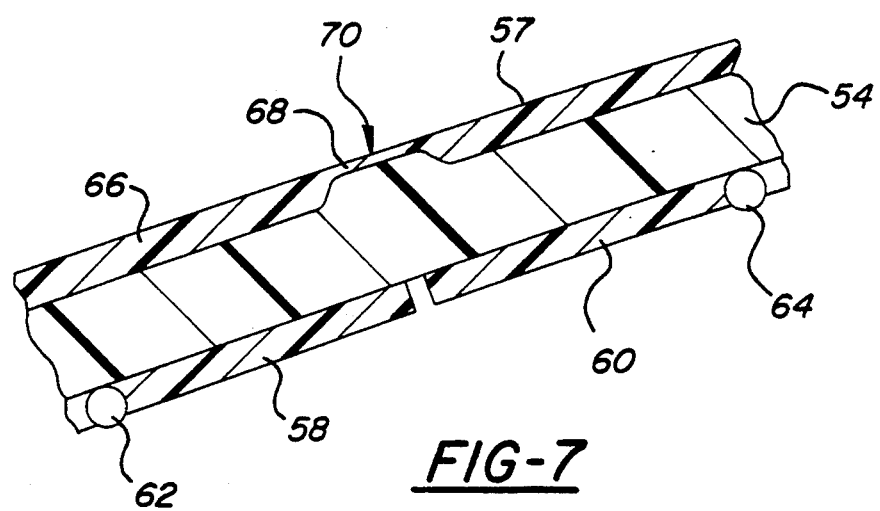
FIG. 7 is an enlarged cross-sectional view of the structure of FIG. 6 showing the details of the air bag deployment opening cover of the present invention.

FIGS. 5–7 show an automobile interior trim structure 50 having a cover for an air bag deployment opening formed in accordance with the present invention. Structure 50 includes an outer skin layer 52, an intermediate foam layer 54, and a rigid insert 56. Outer skin 52 has an exterior surface 57 which is exposed to the automobile occupants when structure 50 is assembled as a component part of an automobile. Structure 50 includes an air bag deployment opening defined by a pair of doors 58, 60 formed as a part of insert 56 and pivotable about a pair of hinges 62, 64, respectively. The portion of outer skin 52 overlying doors 58, 60 comprises a cover 66 for the air bag deployment opening. Cover 66 includes a tear seam 68 defined by a reduction in thickness of cover 66. In the illustrated embodiment, tear seam 68 comprises an H-shaped portion of cover 66. It will of course be understood that tear seams utilizing other shapes (e.g., C, U, or X) can be produced by arranging pins 12 on backside 14 of mold shell 11 in accordance with the desired shape. Tear seam 68 preferably has a width of about one inch and a thickness of approximately twenty thousandths of an inch. The thickness of the portion of cover 66 surrounding tear seam 68 is approximately forty thousandths of an inch.

Referring again briefly to FIGS. 1 and 2, those skilled in the art will understand that temperature gradients may exist between various locations on tear seam portion 20, and, accordingly, there may be a resultant variation in thickness of the layer of thermoplastic material formed on tear seam portion 20. It is believed that the coolest region of tear seam portion 20 will be that furthest from any of the pins 12, which, in the case of the H-shaped tear seam 68 shown in FIGS. 5-7, would be along a line midway between the boundaries (shown as hidden lines) of each of the three legs of H-shaped tear seam 68. This point is indicated in FIG. 7 by the arrow designated with numeral 70.

The construction of and materials used for outer skin 52, foam layer 54 and insert 56 (including hinges 62, 64) are all well known to those skilled in the art. For example, outer skin 52 can be a polyvinyl chloride or an acrylonitrile-butadiene-styrene resin.

FIG. 8 depicts structure 50 as it would be assembled as part of an instrument panel 72 within an automobile. As indicated by the hidden lines, tear seam 68 of cover 66 is located upon the passenger side portion of instrument panel 72 and is invisible to the occupants. An air bag (not shown) is stowed behind cover 66 until such time as it is deployed. Upon inflation, the air bag exerts a sufficient force on doors 58, 60 of insert 56 to rupture foam layer 54 and cover 66 along tear seam 68. Doors 58, 60, pivot about hinges 62, 64 and swing outwardly, thereby forcing like portions of foam layer 54 and cover 66 to separate. The result is as shown in FIG. 9, where doors 58, 60 and cover 66 are depicted in their open position.

It will thus be apparent that there has been provided in accordance with the present invention a method and apparatus for forming a layer of thermoplastic material having a tear seam formed therein which achieves the aims and advantages specified herein. It will of course be understood that the foregoing description is of preferred exemplary embodiments of the invention and that the invention is not limited to the specific embodiments shown. For instance, in the broader aspects of the method of the present invention, any means of heating a portion of inner surface 18 to a lower temperature than the surrounding portions to thereby form a layer of plastic material having a reduced thickness along that portion to form a tear seam for an air bag deployment opening cover can be used without departing from the scope of the present invention. Various changes and modifications will be apparent to those skilled in the art and all such variations and modifications are intended to come within the spirit and scope of the appended claims.

I claim:

1. A method for forming a cover for an air bag deployment opening, the cover having a tear seam which is separable upon an air bag being deployed, the method comprising the steps of:
   (a) providing a mold shell having a backside with a multiplicity of heat transfer pins surrounding an open portion in the shape of a tear seam;
   (b) disposing a thermoplastic material on a front surface of the mold shell;
   (c) heating said heat transfer pins and said open portion to cause a first portion of said front surface to be heated to a first temperature and a second portion of said front surface surrounding said first portion to be heated to a second temperature that is greater than said first temperature, said first and second temperatures being sufficient to cause a unitary layer of said thermoplastic material to form on said front surface, whereby said layer of thermoplastic material has a thinned portion disposed on said first portion; and
   (d) cooling said layer of thermoplastic material.

2. The method of claim 1, further comprising the step of:
   heating said shell prior to step (b).

3. The method of claim 2, wherein step (c) further comprises impinging air having an elevated temperature onto pins extending from a back surface of said shell and transferring heat from said air to said shell through said pins.

4. The method of claim 3, wherein said impinging step further comprises supplying pressurized air having an elevated temperature onto said pins through a plurality of discharge nozzles.

5. The method of claim 4, wherein said cooling step comprising supplying pressurized air having a temperature less than the temperature of said layer of thermoplastic material onto said pins through said discharge nozzles.

6. The method of claim 1 further comprising using a powdered thermoplastic material as said thermoplastic material.

7. The method of claim 1, further comprising using a liquid thermoplastic material as said thermoplastic material.

8. A method for forming an automotive interior trim structure having a tear seam separable under the force exerted by an inflating air bag, comprising the steps of:
   (a) providing a mold shell having a backside with a multiplicity of heat transfer pins surrounding an open portion in the shape of a tear seam;
   (b) heating said heat transfer pins and said open portion on the backside of the mold shell by directing heated fluid thereagainst for selectively heating the mold shell at a first surface portion and at a second surface portion surrounding said first surface portion, wherein said heating step further comprises heating said first portion to a first temperature and heating said second portion to a second temperature that is greater than said first temperature with said first and second temperatures being sufficient to cause a thermoplastic material in contact with said first and second surface portions to form a unitary layer that conforms to said first and second surface portions,
   (c) disposing a thermoplastic material on said first and second surface portions, whereby said unitary layer of said thermoplastic material is formed over said first and second surface portions with the thickness of said layer at said first portion being less than the thickness of said layer at said second portion, and thereafter
   (d) cooling said layer of thermoplastic material.

9. The method of claim 8, further comprising performing step during step (b).

10. The method of claim 1 wherein step (a) includes providing an open portion without heat transfer pins.

11. The method of claim 1 wherein step (a) includes providing heat transfer pins in said open portion having a density less than the density of said multiplicity of heat transfer pins.

12. The method of claim 8 wherein step (a) includes providing an open portion without heat transfer pins.

13. The method of claim 8 wherein step (a) includes providing heat transfer pins in said open portion having a density less than the density of said multiplicity of heat transfer pins.

* * * * *